United States Patent
Hooper

(10) Patent No.: US 7,124,196 B2
(45) Date of Patent: Oct. 17, 2006

(54) PROCESSING A NETWORK PACKET USING QUEUES

(75) Inventor: Donald F. Hooper, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 891 days.

(21) Appl. No.: 10/214,889

(22) Filed: Aug. 7, 2002

(65) Prior Publication Data

US 2004/0054811 A1    Mar. 18, 2004

(51) Int. Cl.
*G06F 15/16* (2006.01)

(52) U.S. Cl. .................. 709/232; 709/234; 709/238; 709/213; 709/214; 370/229; 370/235; 370/413

(58) Field of Classification Search ............... 709/232, 709/234, 213–214, 216, 238, 223; 370/229–230, 370/235, 413, 416
See application file for complete search history.

(56) References Cited

U.S. PATENT DOCUMENTS

| | | | | |
|---|---|---|---|---|
| 6,088,736 A * | 7/2000 | Manning et al. | ............ | 709/234 |
| 6,201,729 B1 | 3/2001 | Rivers | | |
| 6,246,682 B1 * | 6/2001 | Roy et al. | .................. | 370/390 |
| 6,260,099 B1 * | 7/2001 | Gilbertson et al. | ......... | 710/240 |
| 6,397,352 B1 * | 5/2002 | Chandrasekaran et al. | .. | 709/201 |
| 6,442,172 B1 * | 8/2002 | Wallner et al. | ............. | 370/416 |
| 6,445,680 B1 * | 9/2002 | Moyal | ........................ | 370/236 |
| 6,487,202 B1 * | 11/2002 | Klausmeier et al. | ..... | 370/395.1 |
| 6,963,567 B1 * | 11/2005 | Kaniz et al. | ................. | 370/392 |
| 2002/0039362 A1 * | 4/2002 | Fisher et al. | ................. | 370/387 |
| 2002/0110086 A1 * | 8/2002 | Reches | ....................... | 370/235 |
| 2002/0131412 A1 * | 9/2002 | Shah et al. | .................. | 370/390 |
| 2002/0172210 A1 | 11/2002 | Wolrich et al. | | |
| 2003/0043803 A1 | 3/2003 | Hooper | | |
| 2003/0110166 A1 | 6/2003 | Wolrich et al. | | |
| 2003/0231635 A1 | 12/2003 | Kalkunte et al. | | |
| 2004/0028044 A1 | 2/2004 | Hooper | | |
| 2004/0054880 A1 | 3/2004 | Bernstein et al. | | |
| 2004/0059828 A1 | 3/2004 | Hooper et al. | | |
| 2004/0071152 A1 | 4/2004 | Wolrich et al. | | |
| 2004/0098496 A1 | 5/2004 | Wolrich et al. | | |
| 2004/0098720 A1 | 5/2004 | Hooper | | |
| 2004/0202164 A1 | 10/2004 | Hooper et al. | | |
| 2004/0252711 A1 | 12/2004 | Romano et al. | | |

OTHER PUBLICATIONS

"IXP1200 Network Processor", Software Reference Manual, Mar. 2000, Level One and Intel Company, Section 3, "Reference Design", pp. 3-1-3-30.

(Continued)

*Primary Examiner*—Philip B. Tran
(74) *Attorney, Agent, or Firm*—Robert A. Greenberg

(57) ABSTRACT

The disclosure includes description of a technique for processing a network packet at a device. The technique can include accessing an entry for a packet in one of a plurality of source queues and, based on the accessed entry, determining whether to queue an entry for the packet in at least one of a plurality of destination queues.

28 Claims, 11 Drawing Sheets

OTHER PUBLICATIONS

"Intel IXP1200 Network Processor Family", Hardware Reference Manual, Aug. 2001, Section 2, "Technical Introduction", pp. 17-49.
"Intel WAN/LAN Access Switch Example Design for the Intel IXP1200 Network Processor", Application Note, May 2001, 20 Pgs.
"ATM/OC-3 to Fast Ethernet IP Router Example Design", 4 Pgs.
"WAN/LAN Access Switch Example Design for the Intel IXP1200 Network Processor", 4 Pgs.
Gwennap et al: A Guide to Network Porcessors 2nd Ed., published Nov. 2001, The Linley Group; Chapters 3 & 5; 16 pages.
Intel IXP1200 Network Processor Microengine C RFC1812 Layer 3 Forwarding Example Design; Application Note; Sep. 2001; 24 pages.
Spalink et al: Evaluating Network Processors in IP Forwarding; Dep't of Computer Science; Princeton Univ.; Technical Report TR-626-00; Nov. 15, 2000; 12 pages.
Shah: Understanding Network Processors Version 1.0; Sep. 4, 2001; 93 pages.

* cited by examiner

PROCESSING A NETWORK PACKET USING QUEUES

BACKGROUND

Networks enable computers and other devices to exchange data such as e-mail messages, web pages, audio, video, and so forth. To send data across a network, a sending device typically constructs a collection of packets. Individual packets store some portion of the data being sent. A receiver can reassemble the data into its original form after receiving the packets.

A packet traveling across a network may make many "hops" to intermediate network devices before reaching its final destination. Thus, much like a letter delivered by the post office, a packet includes data being sent and information used to deliver the packet. In technical terms, this information is often stored in the packet's "payload" and "header(s)", respectively. The header(s) may include information for a number of different communication protocols that define the information that should be stored in a packet. Different protocols may operate at different layers. For example, a low level layer generally known as the "link layer" coordinates transmission of data over physical connections. A higher level layer generally known as the "network layer" handles routing, switching, and other tasks that determine how to move a packet forward through a network.

Many different hardware and software schemes have been developed to handle packets. For example, some designs use software to program a general purpose CPU (Central Processing Unit) processor to process packets. Other designs, such as designs using components known as ASICs (application-specific integrated circuits), feature dedicated, "hard-wired" approaches.

To combine the programmable flexibility of a CPU with the speed often associated with an ASIC, many vendors sell programmable devices known as network processors. Network processors enable software programmers to quickly reprogram network processor operations. Yet, due to their specially designed architectures, network processors can often rival the packet processing speed of an ASIC.

The versatility of network processors contributes to their appeal. Currently, network processors can be found in a variety of products including routers, switches, firewalls, line cards, and storage area network (SAN) components, among others.

DETAILED DESCRIPTION

Network devices can perform a variety of processing tasks upon received packets. Typically, devices are configured to perform these tasks quickly to keep up with the heavy volume of packets traveling through a network. Generally, these devices also strive to conform to a variety of other constraints. For example, many routers attempt to maintain an ordering of packets. For instance, a router should transmit packets arriving and leaving via the same pair of input and output ports in the same relative order in which they arrived. Other protocols and devices operate under other packet ordering constraints.

Figure 1:
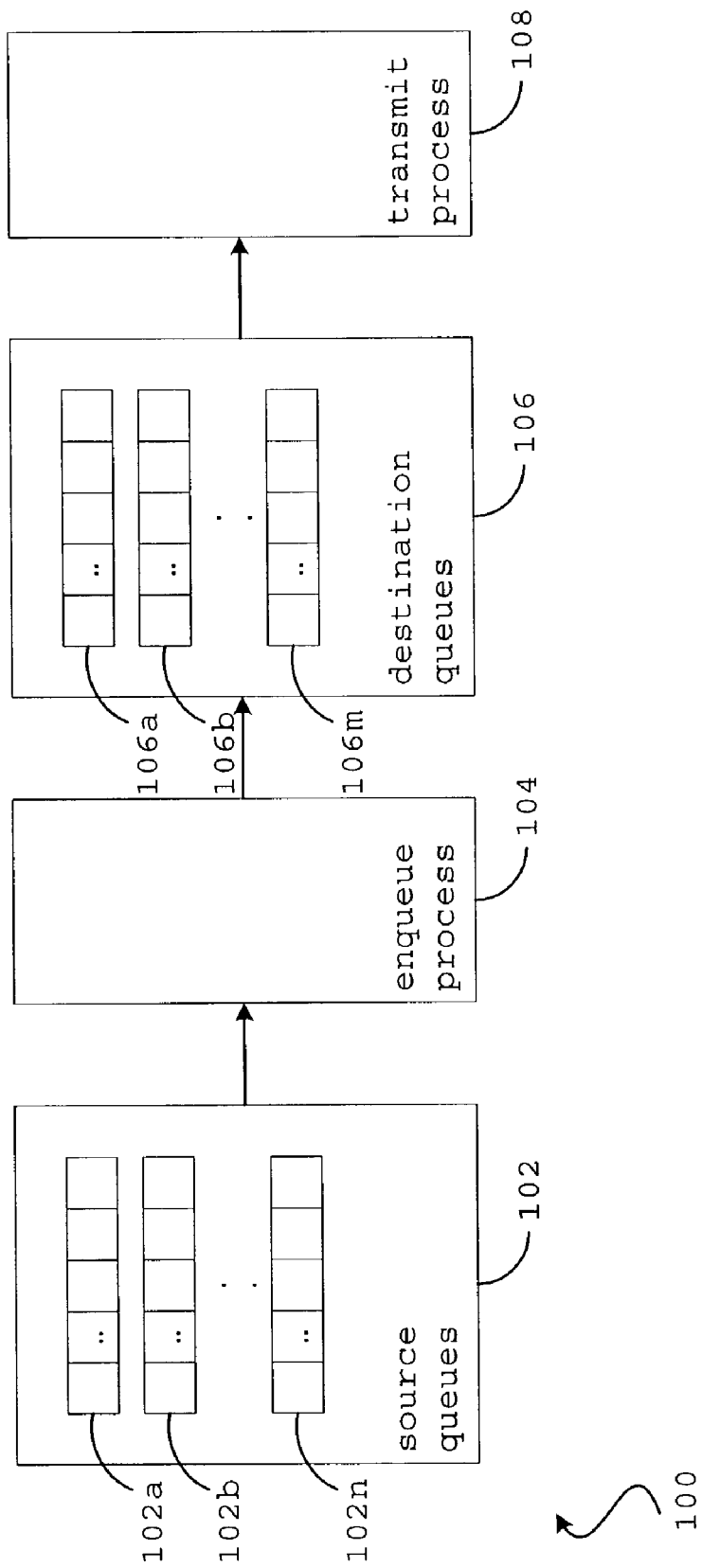
FIGS. 1 to 6 are diagrams illustrating operation of packet source and destination queues.

FIG. 1 illustrates an example of a scheme 100 that can enable a network device to efficiently process packets while potentially preserving a desired packet ordering. As shown in FIG. 1, the scheme 100 features a collection of source queues 102a–102n that correspond to different packet sources. For example, a source queue 102a–102n may correspond to a port, an incoming interface, source Ethernet or IP (Internet Protocol) address, or other identification of how a packet arrived. For instance, source queue 102a may queue entries for packets that arrived at a first port while source queue 102b queues entries for packets that arrived at a second port. A queue 102a–102n entry may be allocated for a packet after identification of the packet's source. The placement of the entry within the queue 102a–102n may be determined such that packets arriving from the same source retain the same relative ordering within the queue 102a–102n as the order in which they arrived.

As shown, the scheme 100 also features a collection of destination queues 106a–n that correspond to different destinations. Similar to a source queue 102, a destination queue 106a–106n may correspond to an outgoing port, outgoing interface, destination Ethernet or IP address, or other identification of how the packet is to be transmitted. For example, destination queue 106a may queue entries for packets destined for transmission out a first port while destination queue 106b queues entries for packets destined for transmission out a second port. A transmit process 108 continually pulls packets off the destination queues 106 for network transmission.

These source 102 and destination 106 queues may be implemented using a variety of data structures. For example, the queues 102, 106 may be implemented as a collection of rings (e.g., linked lists or arrays).

Different packets queued in a particular source queue 102a–102n may be destined for different destinations. Thus, enqueue process 104 continually pulls entries off the source queues 102a–102n and adds corresponding entries in the appropriate destination queue 106a–106n. To select the appropriate destination queue 106a–106n for a packet in a source queue 102a–102n, the enqueue process 104 accesses destination information for the packet (e.g., which port will be used to transmit the packet). Potentially, a source queue 102 entry may be queued to multiple destination queues 106 (e.g., in the case of "multicasting").

Unfortunately, despite the fact that resources may have been trying to determine destination information for a packet as the packet's entry moved forward within its source queue 102a–102n, the packet's destination information may not be known by the time the packet reaches the head of the queue 102a–102n. When this occurs or when packet processing is otherwise deemed incomplete, the enqueue process 104 may cease pulling packets from the packet's source queue 102a. By analogy, this is much like an assembly line's conveyor belts being stopped. During this stoppage, instead of inactively waiting for the release of the "blocking" packet, resources can continue processing packets including other packets in the blocked packet's queue 102a–106n. Once the blocking packet is released, the enqueue process 104 can potentially make up for lost time by moving (e.g., adding destination queue entries) a collection of packets to the appropriate destination queues 106 from the previously halted source queue 102a–106n. This "mass" transfer can be performed to preserve the relative ordering of packets received from a particular source.

The technique described above can be used to maintain an ordering to packets transmitted. For instance, in the scheme above, packets sharing the same source 102a–102n and destination 106a–106n queues, will be output by the transmit process 108 in the same relative order in which they were received.

Figure 2:
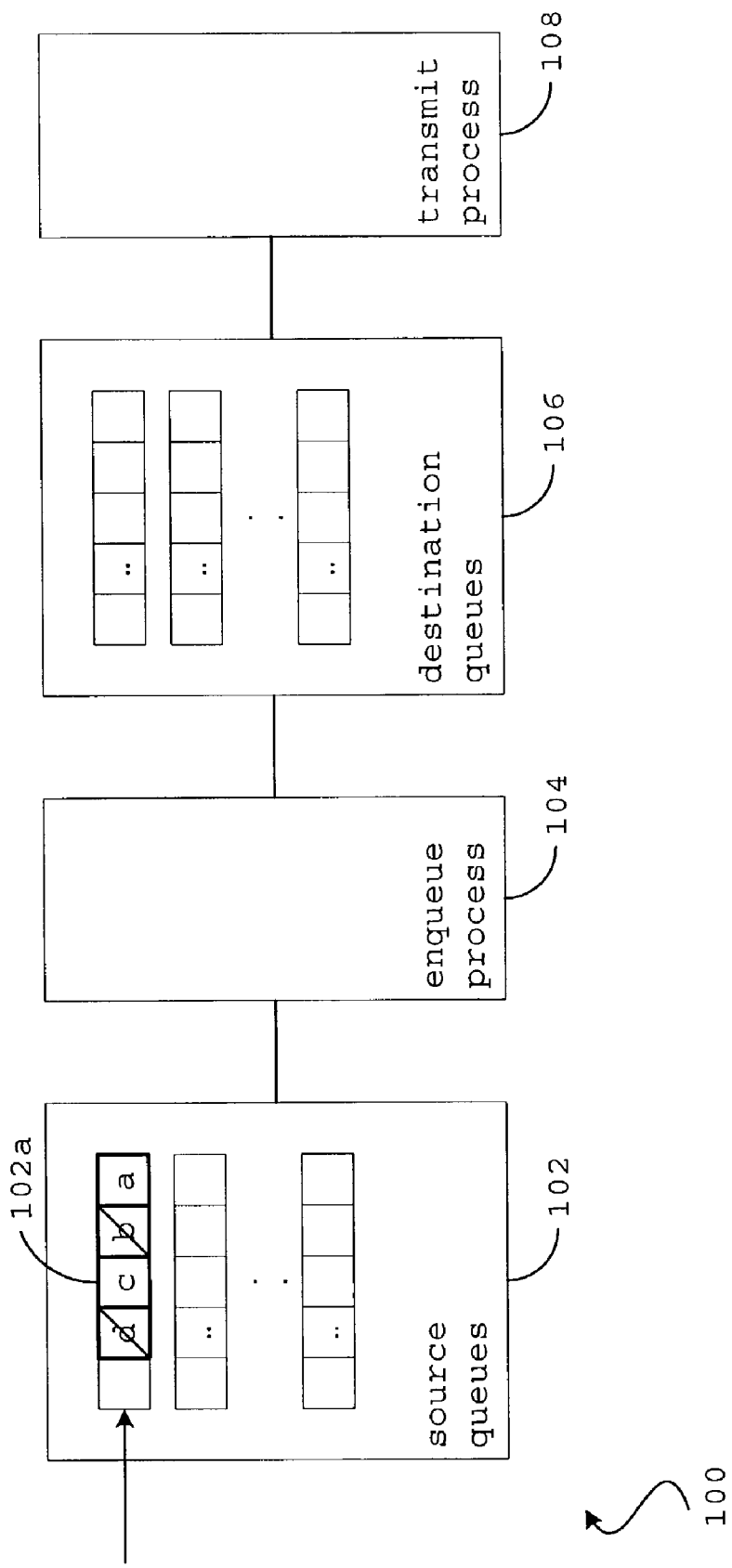

To illustrate sample operation of this scheme, FIGS. 2–6 depict the handling of a series of packets arriving at a particular source. As shown in FIG. 2, packets "a" through "d" are added to source queue 102a after a determination of their source. The ordering of the packets within the queue 102a may be based on the order of their arrival. FIGS. 2–6 depict blocked packets (e.g., packets awaiting a determination of their destination and/or the completion of other packet processing) with a slash. Thus, in this example, packets "b" and "d" are initially blocked.

A blocked packet may be identified in a variety of ways. For example, a "blocking" flag may be associated with a queued packet. The enqueue process 104 may examine this flag to determine whether to add an entry for the packet to a destination queue 106. Once the packet's destination has been determined or other packet processing has completed, the packet's "blocking" flag may be cleared. A wide variety of other schemes could also be used to identify blocked packets to the enqueue process 104 (e.g., setting some packet field to a unique value or by setting a "valid" bit).

Figure 3:
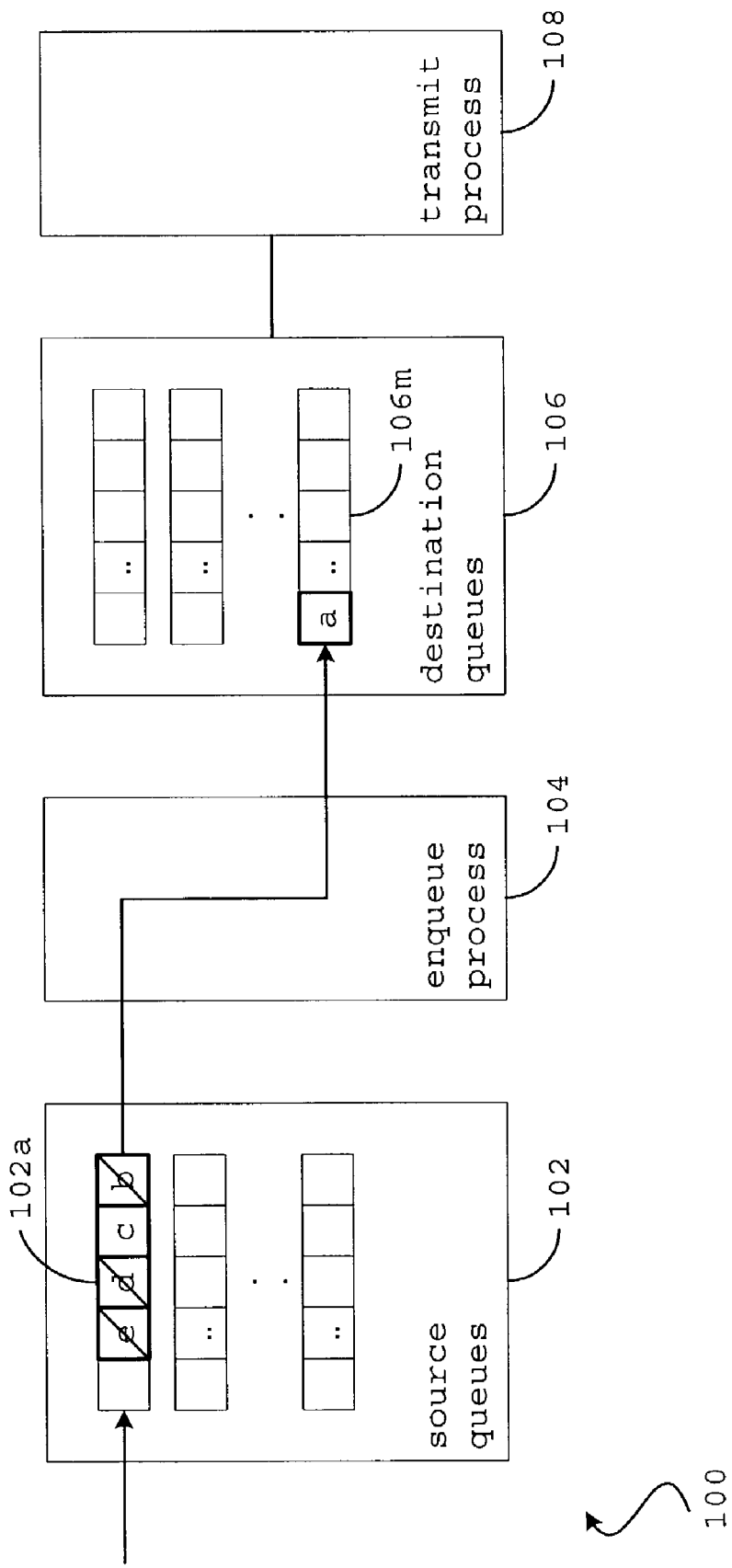

As shown in FIG. 3, since packet "a" is ready to be queued in a destination queue 106, the enqueue process 104 removes packet "a" from source queue 102a and enqueues the packet in the appropriate destination queue 102c. Packets "b"–"e" move forward within the source queue 102a. Additionally, another packet, "e", is added to the source queue 102a.

Figure 4:
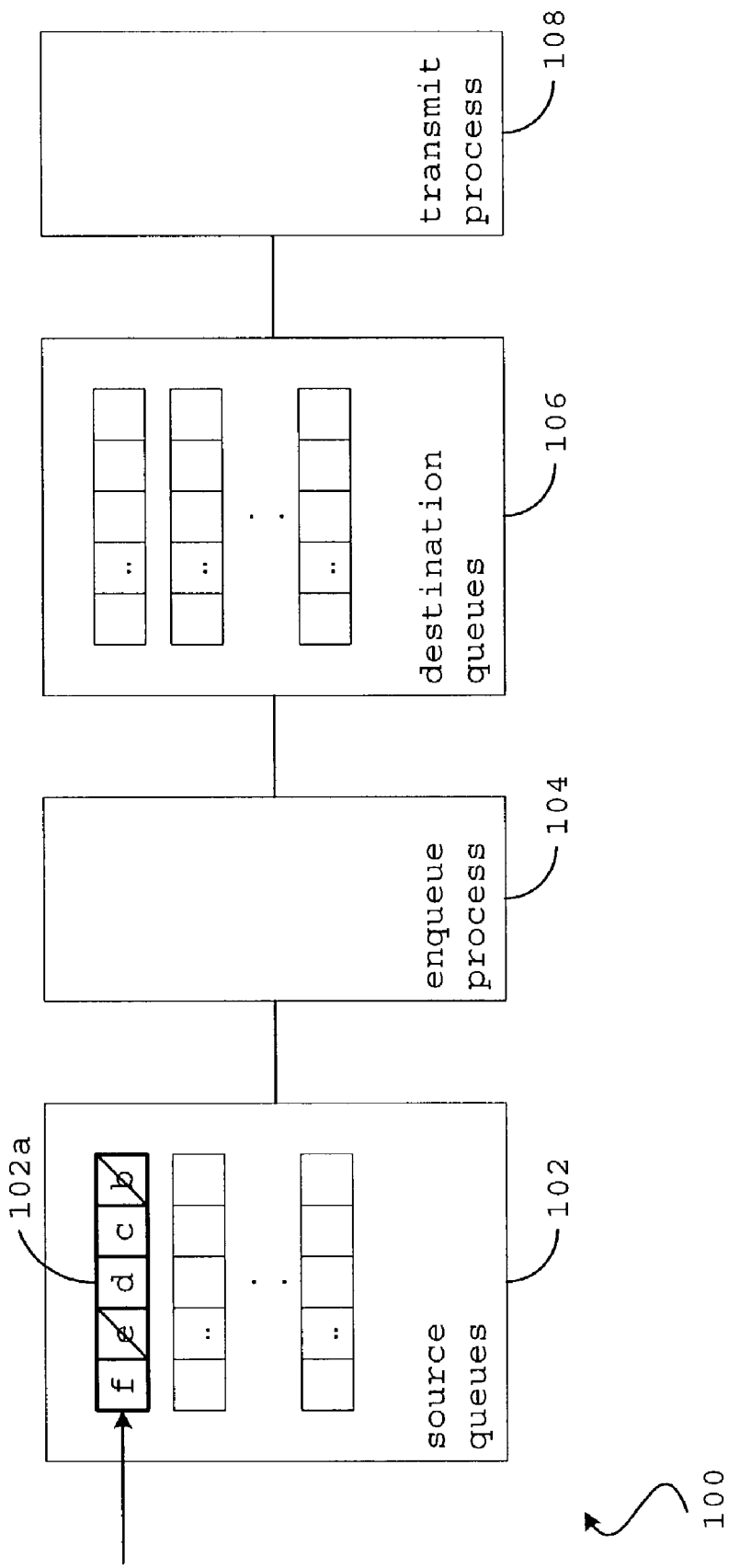

As shown in FIG. 4, despite advancement of blocked packet "b" to the head of the queue 102a, the enqueue process 104 does not remove the packet from the source queue 102a. Nor does the process 104 remove packets queued behind packet "b". Essentially, the queue 102a may be held at a stand still until the release of packet "b". However, as shown in FIG. 4, despite this temporary halting of the queue 102a, packet "d" has been released (e.g., its destination was determined and queue entry updated). This illustrates how processing resources can continue to operate on queued packets while the queue 102a is halted.

Figure 5:
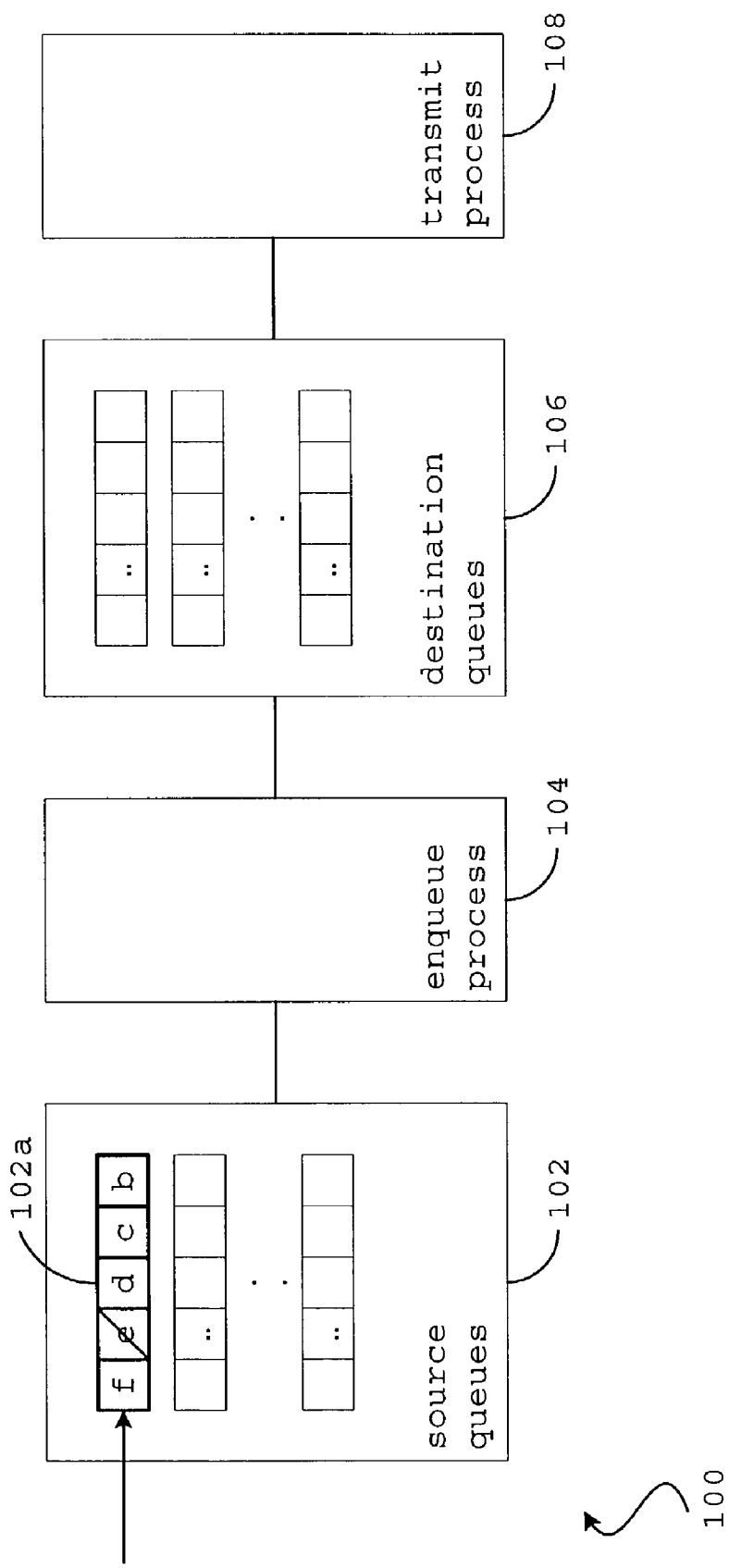
Figure 6:
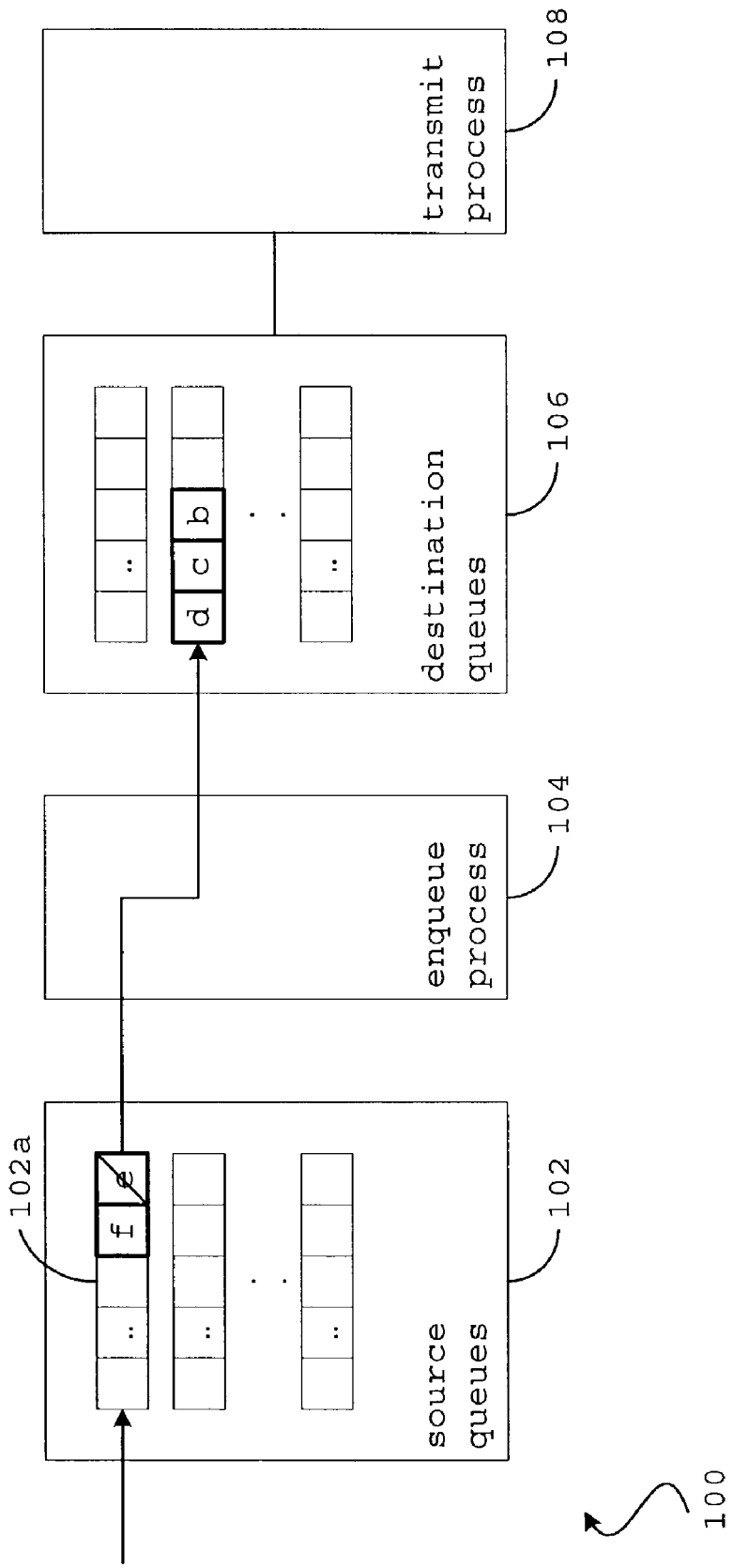

Eventually, as shown in FIG. 5, resources determine the destination and/or complete processing of packet "b" needed to release the packet. As shown in FIG. 6, thereafter, the enqueue process 104 can not only queue packet "b" in a destination queue 106b, but can queue an entire chain of packets (e.g., "b", "c", and "d"), for example, until the process 104 encounters another "blocking" packet (e.g., "e"). Again, this mass queuing enables the scheme 100 to quickly "drain" the source queue 102a of its temporary backlog.

The queuing of packets may be done in a variety of ways. For example, a copy of an entire packet may be added as a queue entry. As a more preferable alternative, instead of the queuing the packet itself, a packet descriptor for a given packet may be constructed and added to the queue. The descriptor can include a reference to the location of the packet in memory and can include other information such as packet size, packet type, a pointer to the next descriptor in the queue, and so forth. The use of packet descriptors can reduce the amount of data manipulation used by the scheme. As yet another alternative, a packet placeholder, such as an empty packet descriptor, may be allocated for a packet. The packet placeholder may be filled in as packet processing proceeds.

Figure 7:
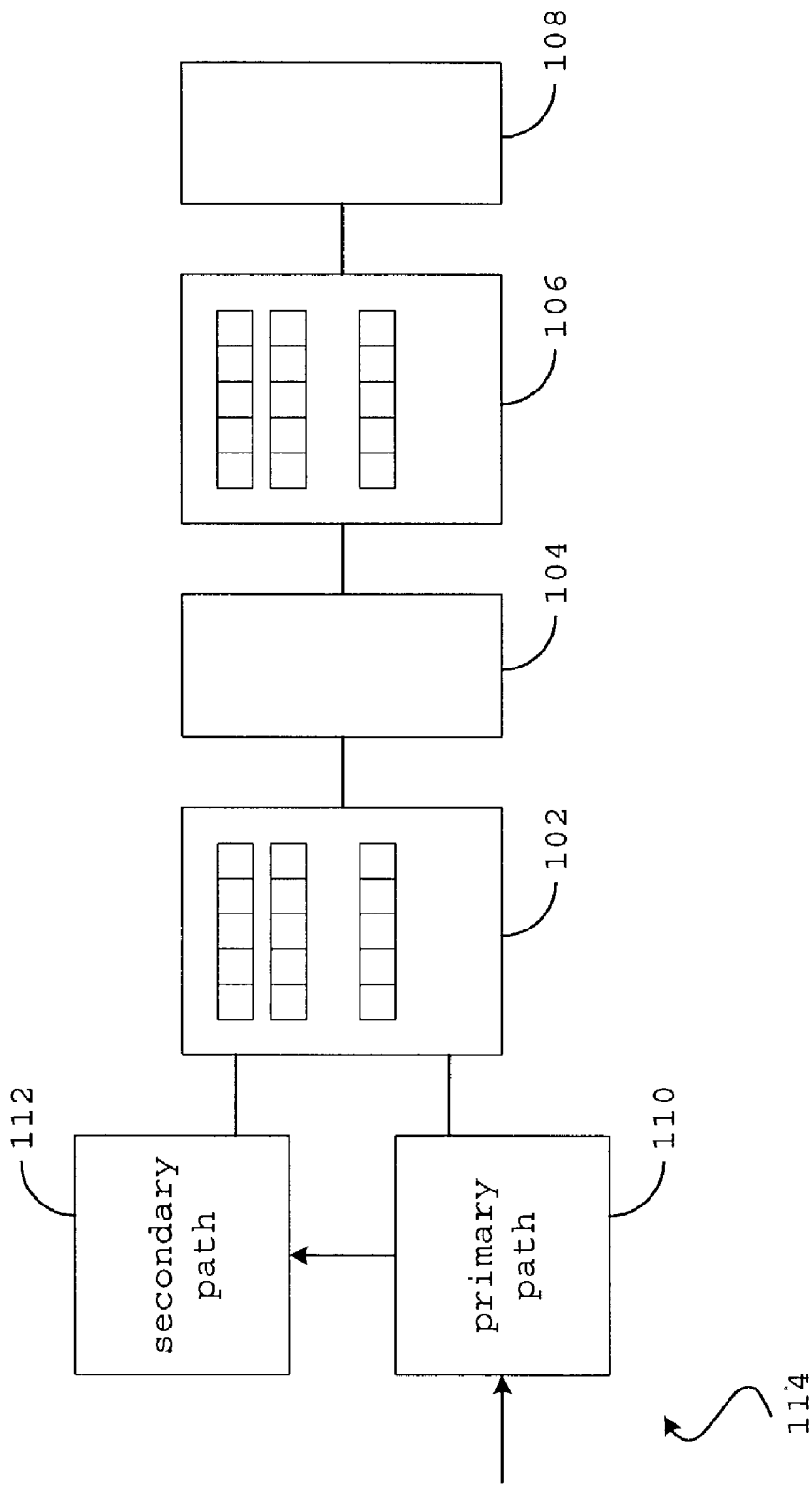
FIG. 7 is a diagram illustrating packet processing by a primary and secondary path.

The scheme 100 may be used in a wide variety of environments and by a wide variety of devices. For example, FIG. 7 depicts a packet processing configuration 114 that uses the queuing scheme described above. As shown, the configuration 114 features a primary path 110 (e.g., a "fast path") and a secondary path 112 (e.g., a "slow path") for processing a packet. Both paths 110, 112 may be capable of performing the same packet processing tasks and may execute many of the same processing instructions. Additionally, both paths 110, 112 may access entries in the source queues 102, for example, to unblock a previously blocked source queue 102 entry for transfer to a destination queue 106.

The primary path 110 may completely process a packet without the assistance of the secondary path 112. In such a case, the primary path 110 may enqueue a released entry to the appropriate source queue or may release a blocked entry without the involvement of the secondary path 112.

However, in some circumstances, the secondary path 112 may also participate in the processing of a packet. For example, the primary path 110 may queue a packet for processing by the secondary path 112 after incompletely processing the packet for some period of time. For instance, the primary path 110 may process a packet until notified of the expiration of a timer. The transfer of processing responsibility to the secondary path 112 may include queuing a blocked entry in the source queue 102 for the packet and passing the results of packet processing already performed by the primary path 110 to the secondary path 112. Upon determining the destination of a packet, or otherwise completing processing of the packet deemed necessary for release, the secondary path 112 can release the blocked source queue 102 entry.

Figure 8:
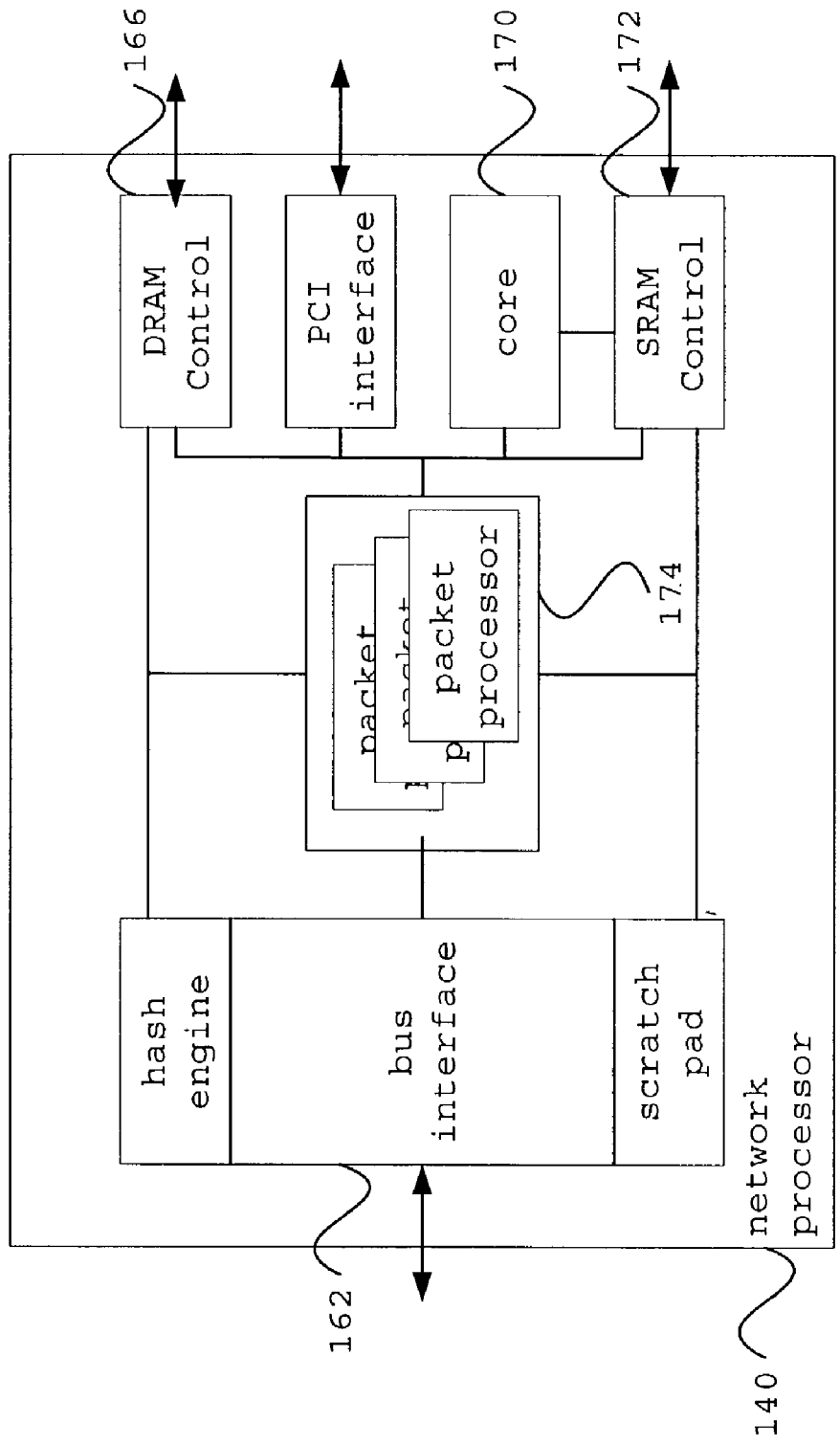
FIG. 8 is a diagram of a network processor.

To provide an example of a device programmed to implement the techniques described above, FIG. 8 depicts a schematic of a single-chip network processor 140. The network processor 140 shown in FIG. 8 is an example of an IXP (Internet eXchange network Processor) network processor sold by Intel® Corporation. Other network processors feature different architectures than the IXP example described above.

As shown, the network processor 140 includes multiple packet processors 174. A packet processor 174 is generally a software programmable Reduced Instruction Set Computer (RISC) processor featuring an architecture optimized for common packet processing tasks (e.g., bit manipulation). These processors typically lack instructions seldom used in packet processing such as floating-point operations, integer multiplication and division, and so forth. A processor 174 may be designed for multithreaded operation, for example, by having hardware registers designated for different threads. The processor 174 may quickly switch between different threads. This can permit an processor 174 to process multiple packets efficiently, for example, by using different threads to process different packets.

In addition to the packet processors 174, the network processor 140 can also include a "core" processor 170. The core processor 170 may be a general purpose CPU programmed to assist the packet processors 174 and handle "control plane" tasks such as updating routing tables or other "housekeeping" tasks associated with different network protocols.

The network processor 140 shown also includes a bus interface 162 for communicating (e.g., sending and receiving packets) with other network components via a collection of ports. The processor also includes interfaces 166, 172 for accessing off-chip memory such as SRAM (Static Random Access Memory) and DRAM (Dynamic Random Access Memory) chips.

The network processor 140 may be programmed to use the techniques described above in a variety of ways. For example, different packet processor 174 threads may provide multiple primary paths described in conjunction with FIG. 7. For instance, different packet processor 174 threads may execute the same set of packet processing instructions for different packets. The core 170 may provide the secondary path, for example, to take over or otherwise provide packet processing assistance. The source queues, destination queues, and packets may be stored in on-chip or off-chip memory (e.g., SRAM or SDRAM).

Figure 9:
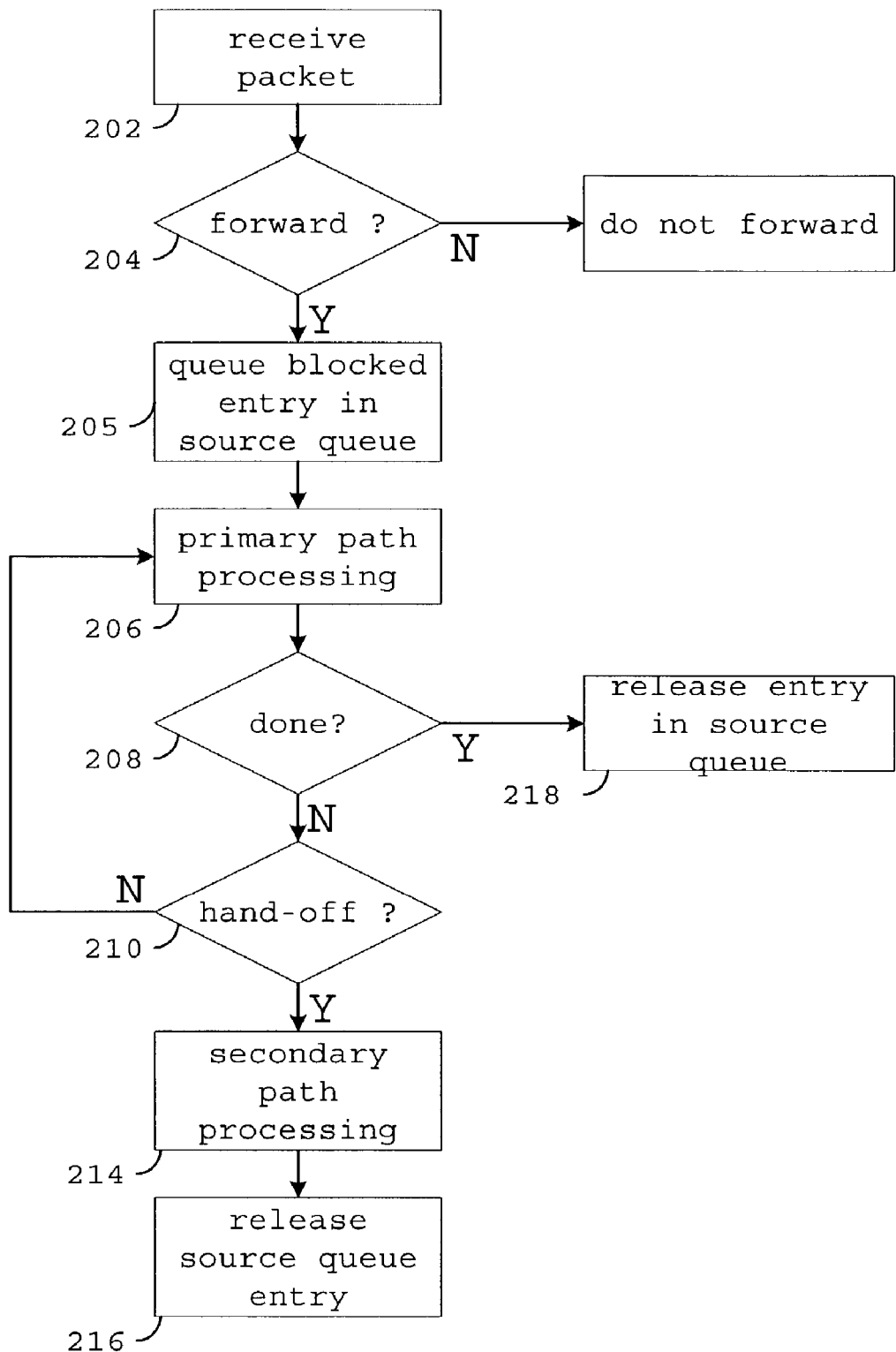
FIGS. 9 and 10 are flow charts of processes for handling network packets.

FIG. 9 illustrates a sample process for handling a packet using the techniques described above. As shown, after receiving 202 a packet from a source, the process determines 204 whether the packet may be forwarded. For example, network computers often exchange data about network conditions or other control plane information that facilitates network communication (e.g., link state packets, ICMP (Internet Control Message Protocol) packets, and ARP (Address Resolution Protocol) packets). Such packets may not be forwarded and need not be queued. Likewise, many devices may drop packets for security or other policy reasons.

Assuming that the packet is determined 204 to be forwardable, the process can queue 205 a blocked entry for the packet and the primary path can proceed 206 with packet processing. This processing can include a wide variety of tasks. For example, the processing can include verification of different information included in the packet. For instance, the processing can verify that the destination MAC (Medium Access Control) address of the packet matches the MAC address of the port the packet arrived on. For IP (Internet Protocol) packets, the processing can also examine the source and destination addresses, for example, to identify "martian" addresses that should not be forwarded. The processing may also include examining a packet's TTL (Time-to-Live) value that identifies how many hops a packet can make before it should be dropped. The processing may also ensure that the packet's self reported size matches the number of bytes received for the packet.

In addition to verification, the processing may include different classification tasks. For example, the processing may identify characteristics of the packet (e.g., its protocol(s), source and destination addresses, and so forth). This information may be used to lookup and apply filtering or other rules to the packet.

Processing of forwardable packet typically includes a determination of the destination for the packet. For example, for an IP packet, this may involve looking up the packet's IP destination address in a routing table to lookup the outgoing interface that should be used to transmit the packet. The interface identifies a destination port offering a connection to a remote device. Such processing may also involve a determination of a lower-level address (e.g., an Ethernet address) of the device that will receive the packet.

As shown, the primary path may process 206 the packet completely 208 and release 218 the queued entry for the packet. Resources (e.g., threads) processing the packet may then turn to the processing of a different packet. Alternately, the primary path may transfer 210 responsibility for processing the packet to the secondary path, for example, after the expiration of a primary path time budget. For example, the primary path may queue the packet for processing 214 by the secondary path. As shown, the secondary path can release 216 the packet after further processing 214.

Figure 10:
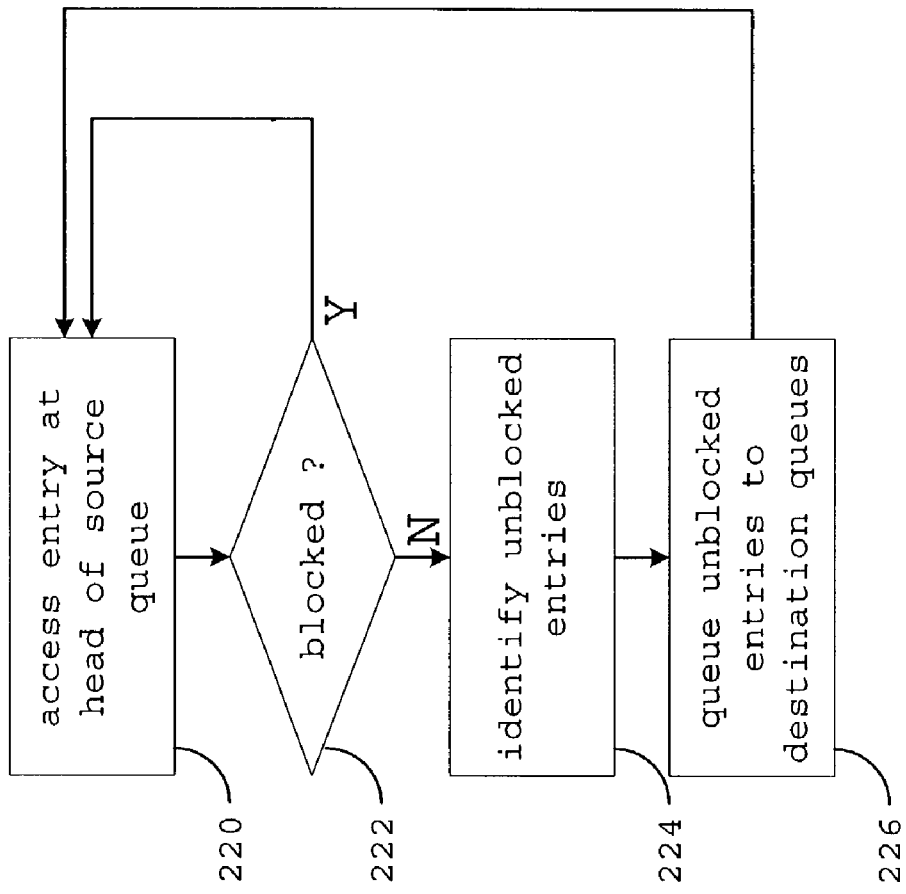

As shown in FIG. 10, concurrent with the operation of the process illustrated in FIG. 9 is a process (e.g., the enqueue process 104) that queues released source queue entries to the appropriate destination queues. As shown, the process accesses 220 the head of a source queue. If this source queue entry is blocked 222, the process will revisit 220 the source queue at a later time. For example, the process may perform a round-robin of different source queues. If the entry is not blocked 222, the process may identify 224 one or more entries in the source queue to add 226 to the appropriate destination queue(s). For example, the process may add entries to destination queues for a chain of source queue entries ranging from the head of the queue to the first blocked entry currently within the source queue. Potentially, processing may continue (not shown) on packets having entries in a destination queue.

Figure 11:
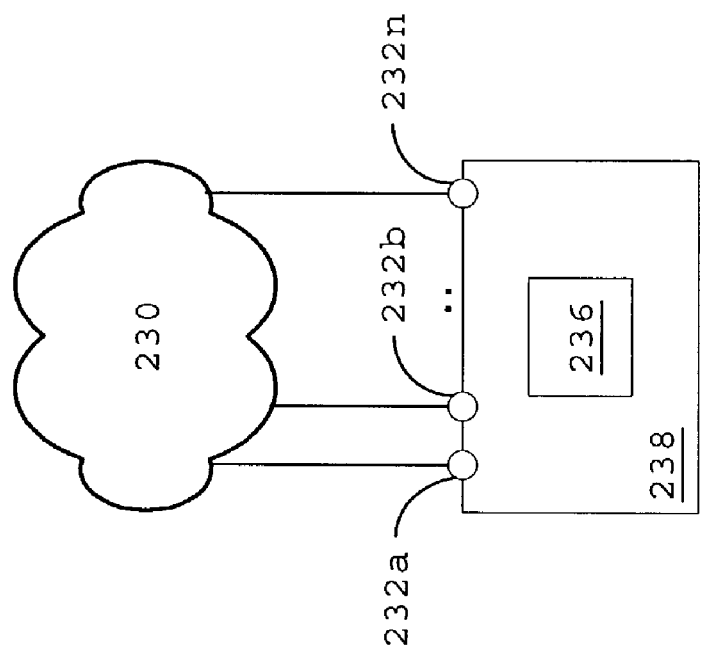
FIG. 11 is a diagram of a network device.

FIG. 11 illustrates a network device 238 that can implement the scheme described above.

As shown, the device 238 features a collection of communication ports 232*a*–232*n* for communicating with other network 230 devices via transmission mediums (e.g., copper, optic cables, and/or wireless transmission) used by the ports 232*a*–232*n*. The device 238 also includes one or more medium access control (MAC) devices for handling data transmission over the transmission mediums (e.g., an Ethernet or SONET MAC controller). As shown the device 238 also includes a processing block 236 that can process a packet received via the communication ports 232*a*–232*n* and MAC devices using the approach described above. The processing block may include a network processor (e.g., the processor illustrated in FIG. 8) or may include other packet processing elements.

A wide variety of alternate implementations may use the queuing techniques described above. For example, an implementation may feature primary and secondary paths that divide responsibilities differently. For instance, different tasks may be divided between the paths instead of both paths being programmed to perform the same processing tasks. Additionally, the techniques described herein are not limited to a particular hardware or software configuration and may have applicability in a wide variety of devices and environments. For example, the techniques may used for a wide variety of network protocols operating within different network protocol stack layers.

The techniques may be implemented in hardware, software, or a combination of the two. Preferably, the techniques are implemented in computer programs such as a high level procedural or object oriented programming language. The program(s) can be implemented in assembly or machine language if desired. The language may be compiled or interpreted.

Other embodiments are within the scope of the following claims.

What is claimed is:

1. A method of processing network packets at a device, the method comprising:
    enqueueing entries designated as head of queue blocking for respective network packets received from network source ports in a one of a corresponding plurality of source queues in which entries are ordered based on the order of receipt of the network packets;
    designating respective previously enqueued entries as not head of queue blocking after determining respective destinations of the respective network packets;

accessing an entry in a one of the plurality of source queues, the entry corresponding to a one of the respective network packets; and based on the accessed entry, determining whether to queue an entry for the entry's packet in at least one of a plurality of destination queues, wherein if the entry is designated as head of queue blocking, an entry for the packet is not queued in at least one of the plurality of destination queues and the accessed entry remains enqueued in the at least one of the plurality of source queues until the accessed entry is designated as not head of queue blocking.

2. The method of claim 1, further comprising not queuing an entry in the plurality of destination queues for an entry other than the accessed entry in the one of the plurality of source queues until after the accessed entry is designated as not head of queue blocking.

3. The method of claim 1, further comprising, before the accessed entry is designated as not head of queue blocking, determining a destination for an entry in the one of the plurality of source queues storing the accessed entry other than the accessed entry.

4. The method of claim 1, further comprising, after the accessed entry is designated as not head of queue blocking, queuing a group of entries designated as not head of queue blocking from the one of the plurality of source queues in the destination queues before queuing any entries from any other of the plurality of source queues.

5. The method of claim 1,
wherein the designating an entry as not head of queue blocking comprises changing a blocking flag associated with the entry; and
wherein the determining whether the entry is designated as head of gueue blocking comprises accessing the blocking flag.

6. The method of claim 1, further comprising, providing a primary processing path and a secondary processing path wherein both the primary processing path and the secondary processing path comprise sets of instructions to determine destinations for respective network packets.

7. The method of claim 6, wherein the primary processing path and secondary processing path comprise sets of instructions to be executed by different processors.

8. The method of claim 6, wherein the primary processing path queues processing of the packet by the secondary processing path.

9. The method of claim 8, further comprising, adding a entry designated as head of queue blocking to the source queue for the packet prior to processing by the secondary processing path.

10. The method of claim 1, further comprising queuing entries for the network packets in the plurality of source queues.

11. The method of claim 1, further comprising:
determining whether a packet is forwardable; and
if it is determined that the packet is not forwardable, not queuing a entry for the packet in any one of the plurality of source queues.

12. The method of claim 1, wherein the device comprises a network processor.

13. The method of claim 12, wherein the network processor comprises multiple programmable packet processors.

14. The method of claim 12, wherein the packet processor comprises a packet processor having an instruction set that does not feature floating point operation instructions.

15. The method of claim 1,
wherein the plurality of source queues comprise different queues for different ports receiving packets from the network; and
wherein the plurality of destination queues comprise different queues for different ports transmitting packets to the network.

16. The method of claim 1, wherein the determining the respective destinations comprises performing respective lookups in an Internet Protocol routing table.

17. The method of claim 1, further comprising enqueueing entries designated as not head of queue blocking for respective Internet Protocol network packets.

18. The method of claim 1, wherein an entry's designation is changed from head of queue blocking to not head of queue blocking when the entry is not at the head of the respective source queue and is not at the tail of the respective source queue.

19. A computer program product, disposed on a computer readable storage medium, for processing a network packet at a device, the program comprising instructions for causing a processor to:
enqueue entries designated as head of queue blocking for respective network packets received from network source ports in a one of a corresponding plurality of source queues in which entries are ordered based on the order of receipt of the network packets;
designating respective previously enqueued entries as not head of queue blocking after determining respective destinations of the respective network packets;
access an entry in a one of the plurality of source queues, the entry corresponding to a one of the respective network packets; and
based on the accessed entry, determine whether to queue an entry for the packet in at least one of a plurality of destination queues, wherein if the entry is designated as head of queue blocking, an entry for the packet is not queued in at least one of the plurality of destination queues and the accessed entry remains enqueued in the at least one of the plurality of source queues until the accessed entry is designated as not head of queue blocking.

20. The program of claim 19, further comprising instructions for causing the processor to, before the accessed entry is designated as not head of queue blocking release, determine a destination for an entry in the one of the plurality of source queues storing the accessed entry other than the accessed entry.

21. The program of claim 19, further comprising instructions for causing a processor to, after the accessed entry is designated as not head of queue blocking, queue a group of entries designated as not head of queue blocking from the one of the plurality of source queues in the destination queues before queuing any entries from any other of the plurality of source queues.

22. The program of claim 19,
wherein the instructions for causing the processor to designate an entry as not head of queue blocking comprise instructions for causing the processor to change a blocking flag associated with the entry; and
wherein the instructions for causing the processor to determine whether the entry is designated as head of queue blocking comprise instructions for causing the processor to access the blocking flag.

23. The program of claim 19, further comprising instructions for causing the processor to queue processing of the packet by a different processing path.

24. The program of claim 19,
wherein the plurality of source queues comprise different queues for different ports receiving packets from the network; and
wherein the plurality of destination queues comprise different queues for different ports transmitting packets to the network.

25. A system for processing a network packet, the system comprising:
at least one communication port;
at least one Ethernet MAC (Medium Access Control) device coupled to at least one of the at least one communication ports;
at least one processor having access to the at least one Ethernet MAC device; and instructions for causing at least one of the at least one processors to:
  enqueue entries designated as head of queue blocking for respective network packets received from network source ports in a one of a corresponding plurality of source queues in which entries are ordered based on the order of receipt of the network packets;
designating respective previously enqueued entries as not head of queue blocking after determining respective destinations of the respective network packets;
  access an entry in a one of a plurality of source queues, the entry corresponding to a one of the respective network packets; and
  based on the accessed entry, determine whether to queue an entry for the packet in at least one of a plurality of destination queues, wherein if the entry is designated as head of queue blocking, an entry for the packet is not queued in at least one of the plurality of destination queues and the accessed entry remains enqueued in the at least one of the plurality of source queues until the accessed entry is designated as not head of queue blocking.

26. The system of claim 25, further comprising instructions for causing the at least one processor to, before the accessed entry is designated as not head of queue blocking, determine a destination for an entry in the one of the plurality of source queues storing the accessed entry other than the accessed entry.

27. The system of claim 25, further comprising instructions for causing the at least one processor to, after the accessed entry is designated as not head of queue blocking, collectively queue a group of entries from the source queue in the destination queues before queuing any entries from any other of the plurality of source queues.

28. The system of claim 25, wherein at least one processor comprises multiple packet processors having respective instructions sets that do not feature floating point operation instructions.

* * * * *

UNITED STATES PATENT AND TRADEMARK OFFICE
CERTIFICATE OF CORRECTION

| | | |
|---|---|---|
| PATENT NO. | : 7,124,196 B2 | Page 1 of 1 |
| APPLICATION NO. | : 10/214889 | |
| DATED | : October 17, 2006 | |
| INVENTOR(S) | : Hooper | |

It is certified that error appears in the above-identified patent and that said Letters Patent is hereby corrected as shown below:

In column 8, at line 45, after "blocking", delete "release"

Signed and Sealed this

Twenty-seventh Day of March, 2007

JON W. DUDAS
*Director of the United States Patent and Trademark Office*